Jan. 26, 1965 J. M. O'DONNELL ETAL 3,166,814
BRICKMAKING

Filed May 28, 1963 4 Sheets-Sheet 1

INVENTORS
JOHN M. O'DONNELL,
RICHARD O. PLATT &
BY CHARLES D. GABOR

William C. Nealon

ATTORNEY

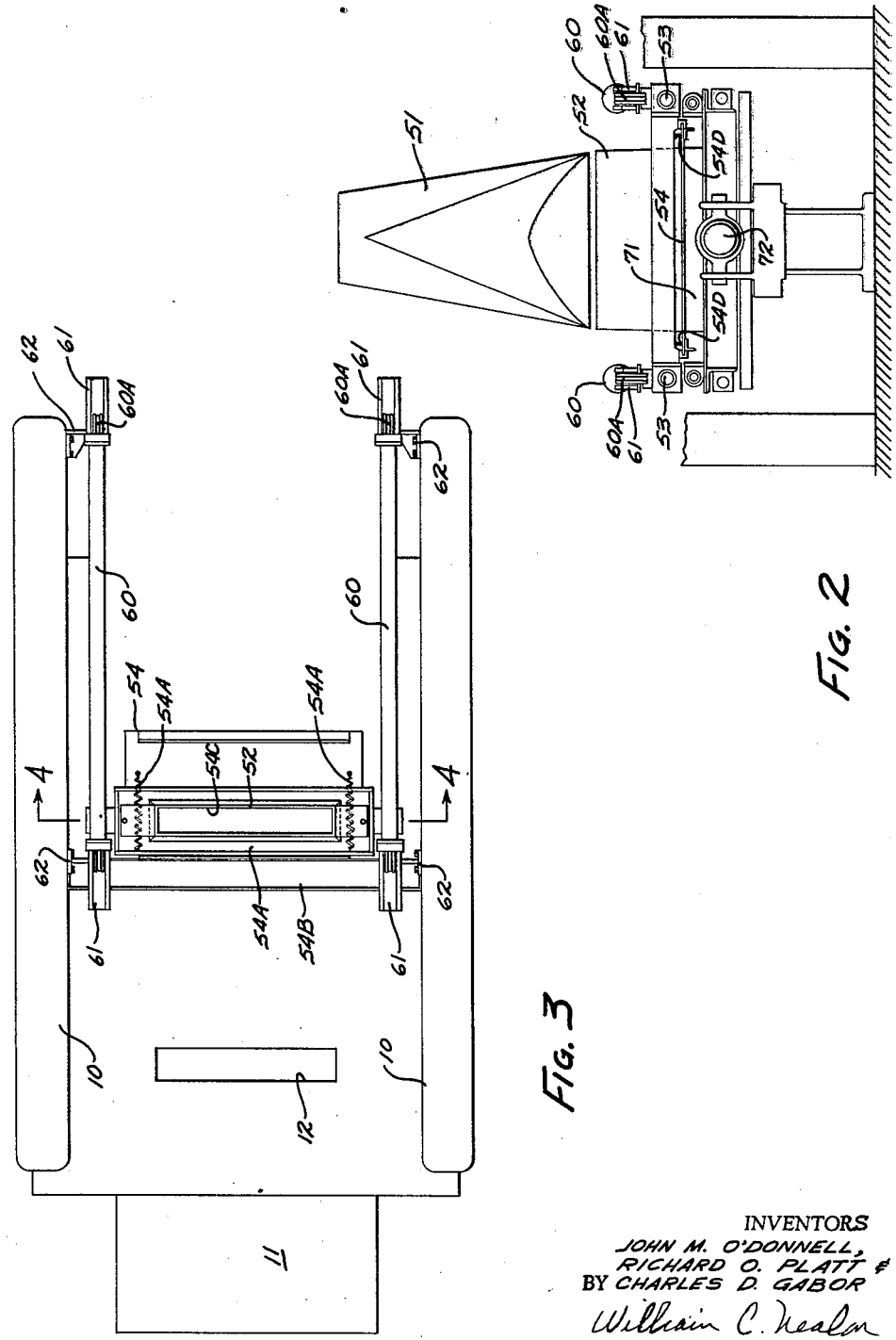

Jan. 26, 1965 J. M. O'DONNELL ETAL 3,166,814
BRICKMAKING

Filed May 28, 1963 4 Sheets-Sheet 3

INVENTORS
JOHN M. O'DONNELL
RICHARD O. PLATT &
BY CHARLES D. GABOR

William C. Nealon

ATTORNEY

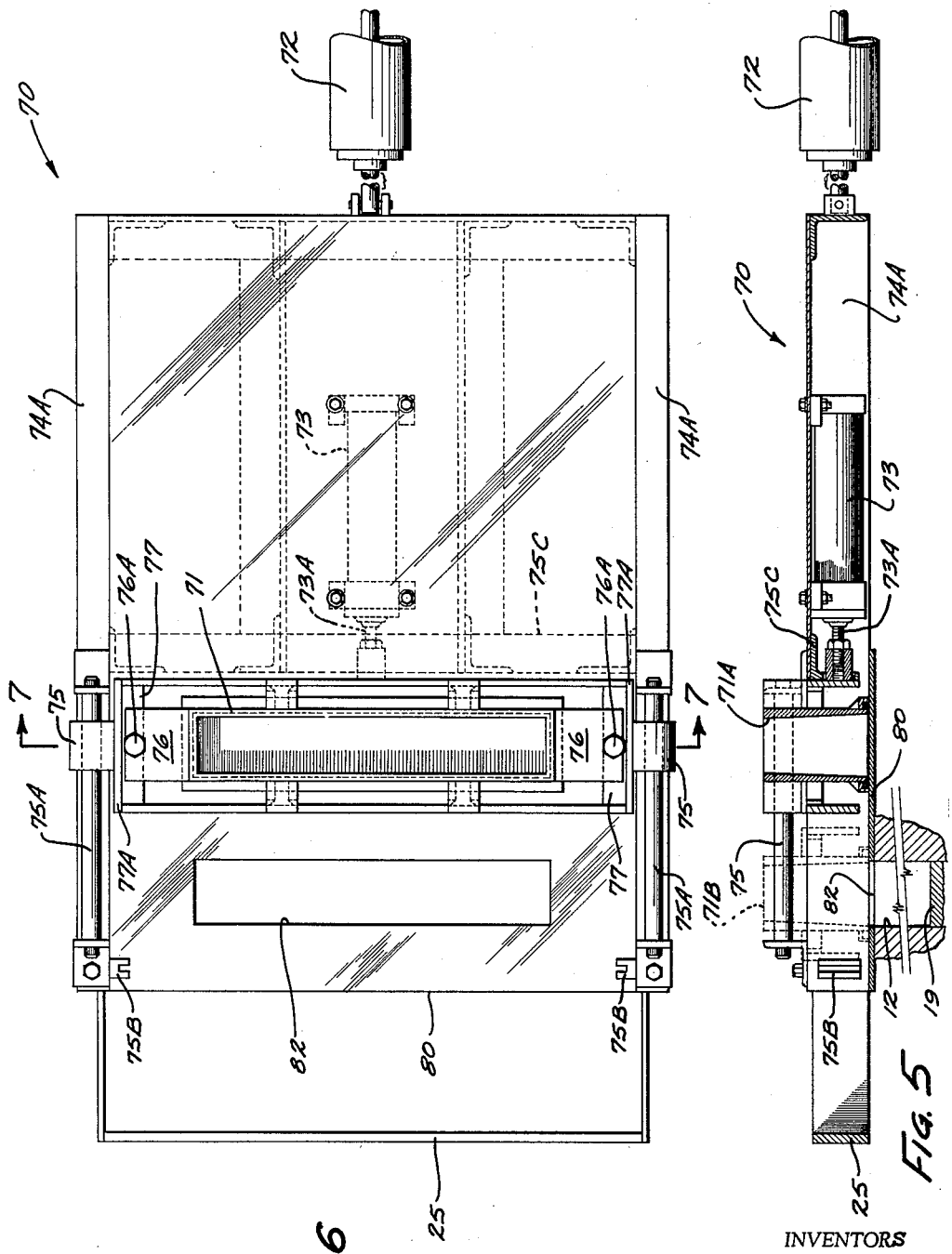

3,166,814
BRICKMAKING
John M. O'Donnell, Pittsburgh, Richard O. Platt, Bethel Park, and Charles D. Gabor, Verona, Pa., assignors to Harbison-Walker Refractories Company, Pittsburgh, Pa., a corporation of Pennsylvania
Filed May 28, 1963, Ser. No. 283,831
4 Claims. (Cl. 25—103)

This invention relates to the manufacture of brick, and more particularly to improved apparatus for fabrication of a plurality of refractory brick characterized by uniformity of strength.

In operating metallurgical furnaces and the like, such as a steelmaking open hearth furnace, the overall hot strength of the roof and its resistance to cracking and peeling may depend not so much on the average strength of the roof brick, as on the strength of a few of the weakest brick scattered through the roof. For example, tests have shown that an increase in bulk density for brick from 182 to 195 p.c.f. about doubled the strength of the brick at room temperature, i.e. from 680 to 1290 p.s.i. In a sustained load test at 2700° F., the increase in density changed the time to fail from two hours to 116 hours. It, thus, appears desirable to assure uniformity of density in order to obtain predictable and uniform minimum strength in a group of brick or like refractory shapes used to fabricate furnace structure.

Accordingly, it is an object of this invention to provide method and apparatus for producing brick of a given raw material batch mixture, which brick are characterized by substantial uniformity of density and strength. It is another object of the invention to provide apparatus for modification of existing brick-making presses, whereby brick of substantially uniform strength and density can be made from a given refractory batch.

Briefly, according to one aspect of the invention, there is provided apparatus for modification of a mechanical brick press, whereby brick of substantially uniform density and strength can be obtained from a given batch mixture. An example of a mechanical brick press which can be modified according to this invention is shown, for example, in United States Patent No. 987,124. This is sometimes called a Boyd-type press. The apparatus of the instant invention includes means arranged to deliver accurately weighed quantities of granular brickmaking material to a two-part mechanical charging system. The charging system is arranged to deposit the accurately weighed quantities of material in a brick press mold cavity in a correlated manner whereby, immediately upon removal of a brick formed from a previously deposited accurately weighed quantity of charging material, a subsequent and equivalent quantity of charge material is deposited in the cavity.

Other objects and further features and advantages of the invention will become apparent to those skilled in the art from a study of the following detailed description with reference to the drawings. In these drawings:

FIG. 2 is a side elevation as viewed from line 2—2 of the apparatus of FIG. 1;

FIG. 3 is a top plan view showing the upper charge box of the apparatus of FIGS. 1 and 2;

FIG. 5 is a side elevation in partial section, with some parts omitted, of the lower charge box of the apparatus of FIG. 1, just prior to its actuation to deposit material in the brick press mold cavity;

FIG. 6 is a top elevation of the parts of the apparatus of FIG. 5; and

Before describing the drawings in detail, it should be understood they are but exemplary of one manner of practicing this invention; and arrangements other than those specifically shown may be used, which are within the scope of the invention.

Figure 1:
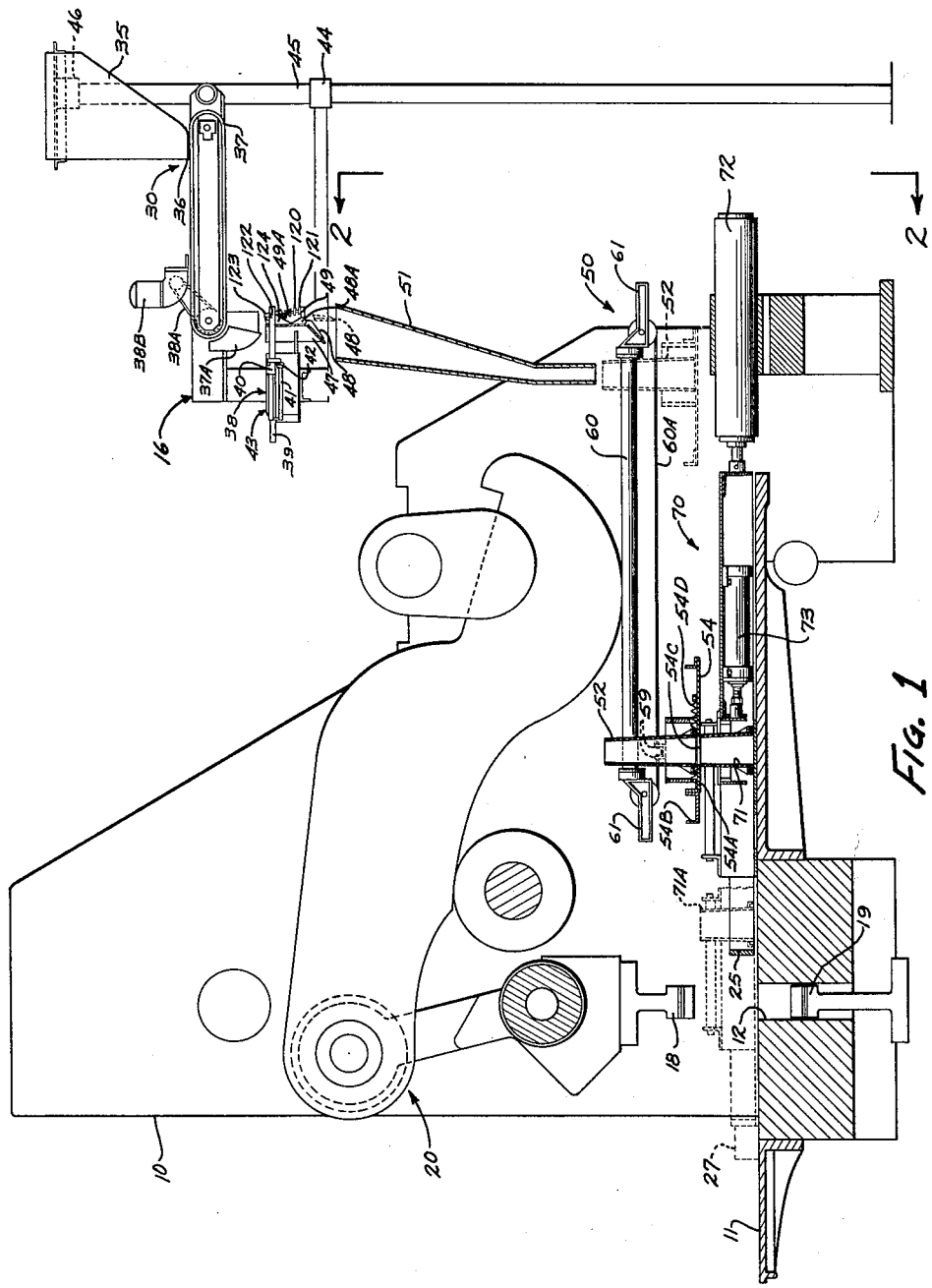
FIG. 1 is a side elevation in partial section with some parts broken away, and with some press parts omitted, in order to better show cooperation between parts of apparatus of this invention as such apparatus can be used with a mechanical press.

Those portions of a Boyd-type mechanical brick press, which are shown in FIG. 1, include a frame 10 adjacent the lower and front part of which the work table 11 is rigidly mounted. This table is provided with a rectangular molding cavity 12, which extends completely through it.

At the back of the table 11 is a feed arrangement 15 according to this invention. The feed arrangement or system is generally comprised of three parts; namely, the batch weigher 30, the upper charge box assembly 50, and the lower charge box assembly 70.

Top and bottom pressure plates 18 and 19 are aligned with the brickmaking cavity 12. These plates are arranged for reciprocal and opposed travel, whereby a batch of brickmaking material may be compressed within the cavity 12 to form a brick. The system of links and arms 20 is conventional in a Boyd-type press, and is interconnected with suitable sources of drive power and the like (which is not shown in the drawings because they are well known) to correlate travel of pressure plate 18 with that of pressure plate 19 to form a brick from material deposited in the cavity 12. This system is so arranged that, after the compression of a batch of material in the cavity, the bottom pressure plate 19 lifts a brick 27 to the table 11; and the brick pusher 25, under the influence of the cylinder 72 (which is a part of the lower charge box assembly 70) moves a finished brick onto the forward lip of the table 11 for removal.

The weigher system 30 is comprised of a first hopper 35, having downwardly converging walls which terminate in a bottom discharge 36 positioned a slight distance above the upper surface of the endless conveyor 37. A scale beam 38 carries an elongate blade 39 along which the weight 40 may be positioned as desired. A small blade 41 is carried by the larger one 39 and is arranged to receive small weights 42 for fine scale adjustment. The weighing unit 43 carries the scale beam in a conventional manner and is, itself, supported by clamp 44 on the post 45. Hopper 35 is carried on post 45 by collar 46.

Positioned beneath the discharge of the conveyor 37, to the right of the weighing unit 43 (as viewed in FIG. 1) is a second hopper 47. The pivotally interconnected spring biased link arms 49 and 49A hold the flap 48 to normally close the bottom discharge of hopper 47. This type of weigher apparatus is available, commercially. Its detailed operation is known and understood by those in the materials handling art, and its operation will be but tersely described herein; in essence, a head of granulated material is maintained in the hopper 35. The conveyor 37 is driven through belt 38A and motor 38B, and gradually removes a windrow of material of substantially uniform dimensions from the bottom of the hopper 35. This windrow of material discharges into the hopper 47 to fall on the baffle or flap 48. Chute 37A assists in directing the discharge of conveyor 37 into the hopper 47. The flap 48 is rigidly connected to link 49 to form a bell crank arrangement pivoted at 48A. The weight of material on flap 48 reacts against spring 120. The bottom of spring 120 bears against collar 121 carried by link 49A. The upper end of link 49A is encompassed within the slotted housing 123 and is pivotally connected by pin 122 to the scale beam 38. The housing 123 is fixed to bracket 124, which is carried by hopper 47.

Thus, when sufficient material rests on the flap 48 to overcome the resistance of spring 120, the link 49A is moved upwardly, its pivot pin 122 commensurately moves in the slots formed through the house 123 and force is exerted on beam 38. This force is resisted by weights 40 and 42, which have previously been positioned on the beam 39 and 41 to predetermine a desired weight quantity of brickmaking material. Initial movement of beam 38 is sensed by weighing unit 43. The weighing unit includes a conventional rheostat, which is connected to the electric motor 38B. Upon initial movement of the beam 38, the rheostat causes the motor to slow down. When the desired weight of material rests on flap 48 and the beam is moved to maximum deflection, the rheostat causes shutoff of the motor, thereby stopping travel of conveyor 37. A predetermined, measured and exact weight of brickmaking material is discharged from the hopper 47, and falls into the chute 51 as the flap 48 opens.

The upper charge box 52 is, generally, rectangular in shape, and its opposed end and sidewalls downwardly diverge in order to present the least resistance to material falling therein from the chute 51. The upper charge box is arranged for reciprocal travel on the opposed parallel guide shafts or rails 53 from a position beneath the chute 51 to a position adjacent the rear of table 11 above the lower charge box 71 of the lower charge box assembly 70. The detailed construction of the upper charge box and its manner of travel on the shafts 53 is described in detail in a separate section hereafter with reference to FIGS. 3 and 4.

The lower charge box assembly 70 includes a lower charge box 71, which is generally rectangular in shape, and has downwardly diverging walls (the slope of the sides is for reasons similar to those discussed with reference to upper charge box 52). The lower charge box 71 is arranged for two-step travel, i.e. after receiving a charge from the upper charge box 52, as is described later, it moves forwardly under the influence of cylinder 72 to the position shown in dotted lines at 71A in FIG. 1 (and as shown in solid lines in FIG. 5). Commensurate with this movement, the upper charge box 52 moves rearwardly to position beneath chute 51 to receive a subsequent charge. When the lower pressure plate 19 lifts a formed brick 27 from the cavity 12, the cylinder 73 moves the lower charge box from its position 71A to an aligned position 71B over the press cavity 12. Commensurate with this movement over the cavity 12, pusher 25 moves the brick 27 to the table 11, as shown in dotted lines in FIG. 1.

Referring again to FIGS. 5 to 7, a plate 80 extends between and carries the channels 74A. The plate 80 is provided with a rectangular opening 82 which opening is slightly larger than the open bottom of lower charge box 71. It is so cut through the plate 80 whereby an unobstructed passage is provided through which the charge of brick-making material may flow into the cavity 12 when the lower charge box is in the second position 71B illustrated in dotted lines in FIG. 5. As in the case of the slide gate 54, the plate 80 similarly serves as a slide gate for the lower charge box 71. Thus, as can be seen in FIG. 5, the plate 80 normally closes the bottom opening of the lower charge box 71. When the lower charge box 71 is in position 71B the material therein is free to flow into the cavity 12 through the opening 82.

As noted, a weighed quantity of material is discharged from the weigher system 30 into the chute 51 through which it falls to the upper charge box 52, which charge box moves forwardly on shafts 53 to a position above the top opening to lower charge box 71. Immediately prior to upper charge box 52 reaching this position, the slide gate 54, which normally closes the open bottom thereof, has its forward end 54A abut the slide gate stop 54B, which stop is rigidly mounted on the frame of the brick press 10. The slide gate 54 is a generally rectangular plate (see FIGS. 1 and 3) having an opening 54C adjacent its end 54A. The opening 54C is slightly larger than the closely spaced open bottom and open top of the respective upper and lower charge boxes 52 and 71. It is so cut through slide gate 54 as to form an unobstructed passage between the said boxes 52 and 71 when the box 52 reaches its most forward position towards the brick press, as shown in FIG. 1. As shown in FIG. 3 most clearly, a pair of springs 54D are arranged to move the slide gate 54 rearwardly as soon as its forward edge 54A is moved from contact with the stop 54B, thereby closing the bottom of upper charge box 52 so it can hold a subsequent charge.

Figure 7:
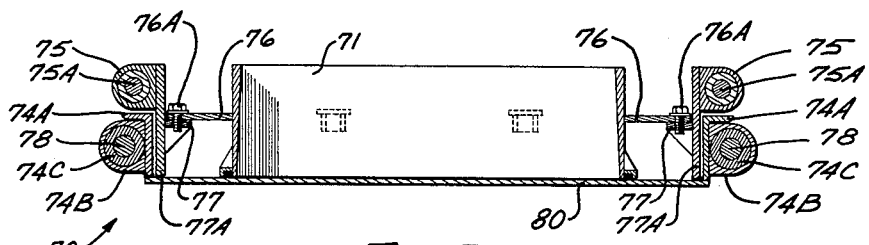
FIG. 7 is a sectional view taken generally along the line 7—7 of the apparatus of FIG. 6.

As noted, the lower charge box 71 moves to position over the cavity 12 in two steps. Referring now to FIGS. 5 through 7, the lower charge box assembly is comprised of the rear cylinder 72 which is welded to the assembly 70, which assembly carries the forward cylinder 73, the lower charge box 71, and related parts. The assembly 70 has a pair of L-shaped channels 74A mounted on opposed sides; and these channels are inverted with their short legs extending outwardly. Housings 74B are carried on the outside of each of the channels 74A. These housings 74B each encompass a linear bushing 74C, whereby the assembly 70 and the parts which it carries may be reciprocally moved over the fixed parallel shafts or rails 78 by the cylinder 72. The point of most forward travel of unit 70 is important; this point is chosen so as to place the lower charge box substantially in the position shown in FIG. 5 to the rear of the cavity 12. This latter position as will be apparent below is determined by the stroke of the cylinder rod 73A.

As shown in FIG. 6, box 71 has housings 75 attached to opposed sides; which housings include bearing assemblies similar to those mounted within the housings 74B for travel over the shafts 75A under the influence of the cylinder 73. Stops 75B and 75C assure precise control of the range of reciprocal travel of the box 71 under the influence of the rod 73A. Noting FIG. 7, for the moment, the box 71 is associated with its bearing and housing assembly 75 as follows: A plate 76 is attached to each side of the box 71. The outer ends thereof are apertured for receiving such as bolts 76A which are arranged for threading in the complementary threaded apertures through ledges 77, carried on the inner surfaces of the plates 77A which latter plates carry the said housings 75 and related bearing assemblies.

Figure 4:
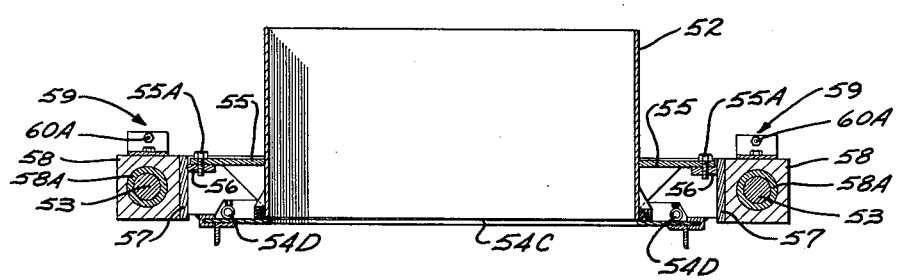
FIG. 4 is a side elevation taken generally along the line 4—4 of the apparatus of FIG. 3.

Referring, further, to FIGS. 2, 3 and 4, the upper charge box 52 is reciprocally associated with its shafts 53 in a manner similar to that of assembly 70 and its shafts 78. Thus, a pair of plates 55 are mounted on opposed sides of the box 52. They have an aperture formed through their respective outboard ends to receive threaded bolts 55A, which bolts are arranged to be received by the complementary threaded apertures through the plates 56 mounted on the inner surfaces of the plates 57, which plates 57 carry the housings 58 on their other sides, which housings together with linear bearings 58A allow smooth reciprocal travel of the upper charge box under the influence of the dual-action cylinder 60. In essence, this cylinder 60 is a hydraulic cylinder having two unidirectionally movable rods, one at each end, each of which is attached at its respective outboard end to one end of the cable 60A. Thus, to move the box 52 to the left, the left hand rod of cylinder 60 extends while the right hand one is retracted thus causing the cable to move in a clockwise direction thereby pulling the box which is attached to it, to the left. It is attached to channel 59 which is itself carried on housing 58.

While illustrating our invention in connection with a Boyd-type mechanical press, it is applicable to other brick forming machines whether they be of the mechanical or hydraulic type. It is also applicable to vibration methods of forming.

The changes necessary in a selected brickmaking machine, for purposes of installing the apparatus of this invention, are comparatively minor and inexpensive. For example, the apparatus of the invention is arranged for bolting to the rear of the press with most of the weight thereof carried by the frame 10, as shown in FIG. 1. Most presses already include a cylinder equivalent to the cylinder 72. It is normally arranged to move a conventional charge box into position over a cavity 12. Substantially all the change necessary with such a system is to replace the conventional charge box with the assembly 70. Of course, the rearward extent of assembly 70 is such as to be compatible with the length of the stroke of the rod of the cylinder 72 so it may position the lower charge box 71 substantially as described with reference to FIG. 5. Further modificaton would include attaching such as brackets 62 to opposed portions of brick press frame 10 in position for carrying the cylinder 61 and the upper charge box assembly 50.

There is preferably a limit switch adjacent the forward and rearward extent of travel of the charge boxes, and the forward and rearward extent of the travel of the lower charge box assembly 70 and charge box 71. These switches are, in an electrical system, arranged to sequentially program the steps of: starting motor 38B to cause the weigher system to fill the box 52 when it is at its rearward position; starting a hydraulic fluid pump or air compressor to move the lower charge box assembly and charge box cylinders to withdraw the respective apparatus to which they are attached, to allow plates 18 and 19 to make a brick; causing coordinated traveling and positioning of the upper and lower charge boxes; allowing transfer of material to the lower one; and finally moving the lower one to position of the brick press cavity. This system can be tied in with the operation of the press. For example, when the lower plate 19 raises a brick 27, the lower charge box moves forward, etc. The system can be actuated by a switch or button adjacent the front of the press, etc.

The granular batches normally used in forming brick by power pressing are by no means fine powders. This class of ware, instead, uses graded mixtures of particle sizes from as coarse as 4 mesh down to much finer grains. By way of example, a batch made from 70% flint clay and 30% semi-hard or plastic clay will commonly show these grain sizes: 30% passing through 4 mesh and held on 10 mesh, 20% passing through 10 mesh and held on 28 mesh, 15% passing through 28 mesh and held on 65 mesh, and the rest passing through a 65 mesh screen. The mesh sizes referred to are of the standard Tyler series of screens. The industry practices wide latitude in this matter but, for this general class of ware made on a brick press, there would always be some material held on a 14 mesh screen. This distinguishes from the quite unrelated art of making such small pressed shapes as electrical porcelain, which would contain no material coarser than 14 mesh, or, generally, any particles coarser than even 65 mesh. These matters are critical in mold charging problems, since the very fine powders have a tendency to flow like water and, therefore, present only minimum difficulties.

Having thus described the invention in detail and with sufficient particularity to enable those skilled in the art to practice it, what is desired to have protected by Letters Patent is set forth in the following claims.

We claim:

1. The combination with brick forming apparatus which includes means defining a brick forming mold cavity, of reciprocally movable upper and lower assemblies, upper and lower charge boxes carried by the respective upper and lower assemblies said boxes having inlets and outlets, said lower charge box assembly being movable between a position over said mold cavity and a filling station to the rear of said mold cavity, said upper charge box assembly being movable between a position beneath weigher means and a position above said lower charge box at its filling station, gate means carried by said respective upper and lower assemblies which normally close the respective outlets of the upper and lower charge boxes, the gate means normally closing the outlet of the upper charge box arranged to open the outlet when it is at its position above the inlet to lower charge box at its filling station, the gate means normally closing the outlet of the lower charge box arranged to open the outlet when it is in position above the mold cavity, weigher means constructed and arranged to deliver a plurality of predetermined weight charges through the inlet of the upper charge box to a position of repose therein when said upper charge box is therebeneath, and means arranged to cause said reciprocal movement of the upper and lower charge box assemblies.

2. The combination of claim 1 in which the lower assembly includes means arranged to remove a previously formed brick from its path of travel towards the brick making cavity before the lower charge box deposits material in said cavity.

3. The combination with brick forming apparatus which includes means defining a brick forming mold cavity, of upper and lower charge boxes which are reciprocally movable, said boxes having inlets and outlets, said lower charge box being movable between a position over said mold cavity and a filling station spaced from said mold cavity, said upper charge box being movable between a position adjacent weigher means and a position above said lower charge box at its filling station, first means associated with the upper and the lower charge boxes normally closing the respective outlets thereof, said first means arranged to open the outlet of the upper charge box when it is at its position above the lower charge box at its filling station and to open the outlet of the lower charge box when it is in position above the mold cavity, weigher means constructed and arranged to deliver a plurality of predetermined weight charges through the inlet of the upper charge box to a position of repose therein when said upper charge box is thereadjacent.

4. The combination with brick forming apparatus which includes means defining a brick forming mold cavity, of upper and lower charge boxes which are reciprocally movable, said boxes having inlets and outlets, said lower charge box being movable between a position in communication with said mold cavity and a filling station spaced from said mold cavity, said upper charge box being movable between a position in communication with weigher means and a position in communication with the inlet of said lower charge box at its filling station, first means associated with the upper and the lower charge boxes normally closing the respective outlets thereof, said first means arranged to open the outlet of the upper charge box when it is at the lower charge box filling station and to open the outlet of the lower charge box when it is at the mold cavity, weigher means constructed and arranged to deliver a plurality of predetermined weight charges through the inlet of the upper charge box to a position of repose therein when the inlet of said upper charge box is in communication therewith.

References Cited by the Examiner
UNITED STATES PATENTS 2,111,915  3/38  MacMillin _____ 25—103
2,893,101  7/59  Britner et al. _____ 25—103

MICHAEL V. BRINDISI, *Primary Examiner.*
ROBERT F. WHITE, *Examiner.*